United States Patent
Laine et al.

(10) Patent No.: US 10,712,180 B2
(45) Date of Patent: Jul. 14, 2020

(54) SEGMENTED POLED OPTICAL FIBER FOR FIBER OPTIC SENSOR AND PHASED ARRAY

(71) Applicant: The Charles Stark Draper Laboratory, Inc., Cambridge, MA (US)

(72) Inventors: Juha-Pekka J. Laine, Boston, MA (US); Richard E. Stoner, Framingham, MA (US); Adam J. Saltzman, Cambridge, MA (US); Timothy J. McCarthy, Cambridge, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 456 days.

(21) Appl. No.: 15/403,443

(22) Filed: Jan. 11, 2017

(65) Prior Publication Data

US 2018/0045540 A1 Feb. 15, 2018

Related U.S. Application Data

(60) Provisional application No. 62/373,829, filed on Aug. 11, 2016.

(51) Int. Cl.
*G01D 5/34* (2006.01)
*G01D 5/353* (2006.01)

(52) U.S. Cl.
CPC ......... *G01D 5/35306* (2013.01); *G01D 5/344* (2013.01); *G01D 5/35322* (2013.01)

(58) Field of Classification Search
CPC .... G01D 5/35306; G01D 5/344; G01D 5/353; G02B 6/4458; G02B 6/4485; G02B 6/4246; G02F 2/02

(Continued)

(56) References Cited

U.S. PATENT DOCUMENTS 4,789,240 A * 12/1988 Bush .................. G01D 5/266
356/477
4,915,503 A    4/1990 Pavlath (Continued)

FOREIGN PATENT DOCUMENTS

WO    WO 2015/170355 A1    11/2015

OTHER PUBLICATIONS

International Searching Authority [EPO] International Search Report—International Application No. PCT/US2017/043599, dated May 3, 2018, together with the Written Opinion of the International Searching Authority, 16 pages.

(Continued)

*Primary Examiner* — Akm E Ullah
(74) *Attorney, Agent, or Firm* — Sunstein LLP

(57) ABSTRACT

A fiber optical sensor and methods for sensing a physical quantity such as rotation using the same. The sensor has an optical fiber supporting propagation of light that is configured as an interferometer. One or more segments of the optical fiber, where the segments may be non-contiguous, are poled in such a manner that a phase shift in light propagating through the fiber is created in response to application of a voltage to an electrode thereby inducing an electric field across a poled segment of the fiber. A phase modulator comprising multiple poled segments is additionally described. Applying phase-shifting effects differentially across poled segments of optical fibers of an array of optical fibers may also allow for steering an optical beam.

15 Claims, 5 Drawing Sheets

(58) Field of Classification Search
USPC .......................................................... 385/12
See application file for complete search history.

(56) References Cited

U.S. PATENT DOCUMENTS

| | | | | |
|---|---|---|---|---|
| 4,929,050 | A * | 5/1990 | Wilson | G01D 5/35303 250/227.17 |
| 5,619,318 | A * | 4/1997 | Yamamoto | G01D 5/266 356/32 |
| 6,259,830 | B1 * | 7/2001 | Bhagavatula | C03B 37/026 385/11 |
| 6,346,985 | B1 * | 2/2002 | Hall | G01D 5/35303 356/477 |
| 6,385,354 | B1 * | 5/2002 | Digonnet | G02F 1/0134 359/240 |
| 6,385,377 | B1 | 5/2002 | Brueck et al. | 385/122 |
| 8,836,950 | B2 * | 9/2014 | Sasaki | G01R 15/246 356/483 |
| 10,247,761 | B2 * | 4/2019 | Muller | G01R 15/247 |
| 2002/0114059 | A1 * | 8/2002 | Bonfrate | G02F 1/3558 359/332 |
| 2007/0065070 | A1 * | 3/2007 | Berger | G01N 21/7703 385/12 |
| 2007/0103692 | A1 * | 5/2007 | Hall | G01D 5/35303 356/478 |
| 2016/0356823 | A1 * | 12/2016 | Gu | G01D 5/266 |

OTHER PUBLICATIONS

Huang et al. "Optical Kerr-Effect in Fiber-Optic Brillouin Ring Laser Gyroscopes," *IEEE Photonics Technology Letters*, vol. 5, No. 3, pp. 365-367 (Mar. 1993).

Farries et al., "Tunable second-order susceptibility gratings for harmonic generation in optical fibers," *Optical Fiber Communication Conference*, Jan. 25, 1988, 1 page.

Fleming et al., "Poled glasses and poled fibre devices," *Journal of the Ceramic Society of Japan*, vol. 116, No. 10, pp. 1007-1023, Jul. 2008.

Kazansky et al., "High second-order nonlinearities in poled silicate fibers," *Optics Letters*, vol. 19, No. 10, pp. 1-3, May 1994.

Kazansky et al., "Glass Fiber Poling and Applications," *Journal of Lightwave Technology*, vol. 15, No. 8, pp. 1484-1493, Aug. 1997.

Liu et al., "Second-harmonic generation in $Ge_{20}As_{25}S_{55}$ glass irradiated by an electron beam," *Optics Letters*, vol. 26, No. 17, pp. 1347-1349, Sep. 2001.

McManamon et al., "A Review of Phased Array Steering for Narrow-Band Electrooptical Systems," *Proceedings of the IEEE*, vol. 97, No. 6, pp. 1078-1096, Jun. 2009.

Myrén, "Poled fiber devices," Doctoral Thesis, Royal Institute of Technology, Department of Physics and Quantum Optics, 91 pages, 2005.

Sireesha et al., "Comparative Assessment on Linearity Test based $V2\pi$ and $V\pi/2$ Voltage Variations of Closed Loop IFOG," *International Journal of Electrical and Computer Engineering*, vol. 6, No. 2, pp. 583-595, Apr. 2016.

Toulouse, "Optical Nonlinearities in Fibers: Review, Recent Examples, and Systems Applications," *Journal of Lightwave Technology*, vol. 23, No. 11, pp. 3625-2641, Nov. 2005.

Welker et al., "Fabrication and characterization of single-mode electro-optic polymer optical fiber," *Optics Letters*, vol. 23, No. 23, pp. 1826-1828, Dec. 1998.

Wooten et al., "A Review of Lithium Niobate Modulators for Fiber-Optic Communications Systems," *IEEE Journal of Selected Topics in Quantum Electronics*, vol. 6, No. 1, pp. 69-82, Jan./Feb. 2000.

* cited by examiner

SEGMENTED POLED OPTICAL FIBER FOR FIBER OPTIC SENSOR AND PHASED ARRAY

RELATION TO PRIOR APPLICATIONS

The present application claims priority from U.S. Provisional Application Ser. No. 62/373,829, filed Aug. 11, 2016, which is incorporated herein by reference.

TECHNICAL FIELD

The present invention relates to optical waveguide components including sensors and optical phased arrays, and, more particularly, to fiber optic components wherein phase modulation of an optical beam is implemented without coupling the beam out of an optical fiber.

BACKGROUND ART

Insofar as fiber optic sensors are often interferometric in design, in which case they typically require modulation of optical phase in one or more arms in order to bias the interferometer at a point of maximal sensitivity, for example, or to facilitate homodyne or other synchronous detection, phase modulators of various sorts are employed to achieve the requisite modulation. In current practice, phase modulation is often achieved in a discrete integrated optic (IO) component, often a lithium-niobate ($LiNbO_3$) chip.

Optical fiber sensors are reviewed in Lee, *Optical Fiber Technology*, Elsevier (2003), which is incorporated herein by reference. Fiber-optic gyroscopes (FOG), in particular, have evolved into instruments that are currently useful, robust and capable of imposing state-of-the-art experimental constraints on physical theories, as reviewed by Lefèvre, *The Fiber-Optical Gyroscope* (2d ed.), Artech House (2014), which is also incorporated herein by reference.

The use of poling to induce second-order optical nonlinearities in optical fibers, for both silicate and chalcogenide glasses, has been discussed in the literature, as by Fleming, et al., *"Poled Glass and Poled Fibre Devices," J. Ceramic Soc. Japan*, pp. 1007-23, (2008) and Liu et al., *"Second harmonic generation in $Ge_{20}As_{25}S_{55}$ Glass Irradiated by an Electron Beam," Opt. Lett.*, vol. 26, pp. 1347-49 (2001), both of which papers are incorporated herein by reference. The poling mechanism entails creating a quasi-permanent charge distribution in the glass by cooling it under a strong applied electric field.

To the best of the knowledge of the current inventors, the use of poled optical fibers for sensing applications has been limited to date to sensing electric fields. U.S. Pat. No. 6,385,377 (to Brueck) provides an example of that application.

Until the current invention, it had always been thought that modulation of the phase of light in an arm of a fiber sensor requires either that light be coupled out of the fiber into a discrete modulation component or else that the fiber would need to be deformed, by means of a piezo-electric phase modulator, or otherwise, with the attendant induction of mode coupling. Both of the foregoing methods are subject to drift and non-linear response. Proton-exchanged lithium-niobate integrated optics phase modulators, often employed as phase modulation elements in fiber optic sensors, are heavily influenced by charge migration phenomena by virtue of their ferroelectric characteristics. A comprehensive review of the performance and limiting characteristics of $LiNbO_3$ modulators may be found in Wooten, *"A Review of Lithium Niobate Modulators for Fiber-Optic Communications Systems," IEEE J. Sel. Top. in Quantum Electronics*, vol. 6, pp. 69-82 (2000), which is incorporated herein by reference. Charge migration phenomena in $LiNbO_3$ result in drift and nonlinear response at low frequencies and environmental sensitivity, features that ultimately limit the performance of inertial measurement systems based on fiber optic gyroscopes (FOGs).

It would be desirable to achieve higher frequency modulation and imperviousness to drift and nonlinear response inherent in existing modulation technologies. Methods for doing so are taught in accordance with embodiments of the present invention, as described below.

SUMMARY OF EMBODIMENTS OF THE INVENTION

In accordance with embodiments of the present invention a fiber optical sensor is provided that has an optical fiber supporting propagation of light in at least one polarized mode and configured as an interferometer. The fiber optical sensor has a source of light coupled to inject light into the optical fiber, a detector for detecting variation, with a sensed quantity, of a phase of interfering light traversing the optical fiber, and an electrode adapted for applying an electric field across a portion, up to an entirety, of the optical fiber. At least one segment of the optical fiber is poled in such a manner as to induce a phase shift in light propagating through the optical fiber in response to application of voltage to the electrode.

In accordance with other embodiments of the present invention, a plurality of non-contiguous segments of the optical fiber may be poled in such a manner as to induce a phase shift in light propagating through the optical fiber in response to application of a voltage to the electrode. The sensed property may be rotation.

In various embodiments, the optical fiber may include a silicate glass, particularly germanium-dope silica, or a chalcogenide glass, or a polymer. The phase shift may be achieved via a process associated with a second-order susceptibility of the optical fiber, such as via a DC or an AC Kerr effect. In accordance with particular embodiments, all phase modulation may be integral to the optical fiber.

In accordance with another aspect of the present invention, a phase modulator is provided having an optical fiber supporting propagation of light in at least one polarized mode and an electrode adapted for applying an electric field across a portion, up to an entirety, of the optical fiber. A plurality of non-contiguous segments of the optical fiber are poled in such a manner as to induce a phase shift in light propagating through the optical fiber in response to application of a voltage to the electrode.

In other embodiments, the optical fiber may include silicate glass, chalcogenide glass, Ge-doped silica, or a polymer. The phase shift may be achieved via a process associated with a second-order susceptibility of the optical fiber, such as a DC or AC Kerr effect.

In accordance with another aspect of the present invention, an optical phased array is provided that has a plurality of waveguide elements, where each waveguide element supports propagation of an optical wave. The optical phased array has an electrode adapted for applying an electric field across a portion, up to an entirety, of at least one of the plurality of waveguide elements, and at least one segment of the waveguide elements is poled in such a manner as to induce a phase shift in light propagating through the waveguide element in response to application of a voltage to the electrode.

In accordance with an embodiment of yet another aspect of the invention, a method is provided for sensing a physical quantity. The method has steps of:

injecting light into an optical waveguide supporting propagation of light in at least one linearly polarized mode, the optical waveguide configured as an interferometer, wherein at least one segment of the optical waveguide is poled in such a manner as to induce a phase shift in light propagating through the optical waveguide in response to application of an electric field;

detecting variation, with the sensed physical quantity, of interfering light traversing the optical waveguide; and modulating the phase of light propagating through the optical waveguide by applying an electric field across the at least one poled segment of the optical waveguide.

In accordance with another embodiment of the invention, the step of detecting variation with the sensed physical quantity may include detecting a rate of rotation of the optical waveguide.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Definitions

As the term is used herein and in any appended claims, the term "optical fiber" shall refer, without limitation, to any optical waveguide that is substantially cylindrical in form. Single-mode and multi-mode fibers, as well as photonic crystal fibers (PCFs) and fibers with multiple cores are encompassed within the scope of the term, as are all compositions, such as silicate or chalcogenide glasses or polymers, however doped.

As used herein, the notation "V$\pi$" shall denote the voltage applied across one or more segments of a nonlinear optical element in order to induce a phase change of $\pi$ radians in an optical wave traversing the optical element.

Figure 1:
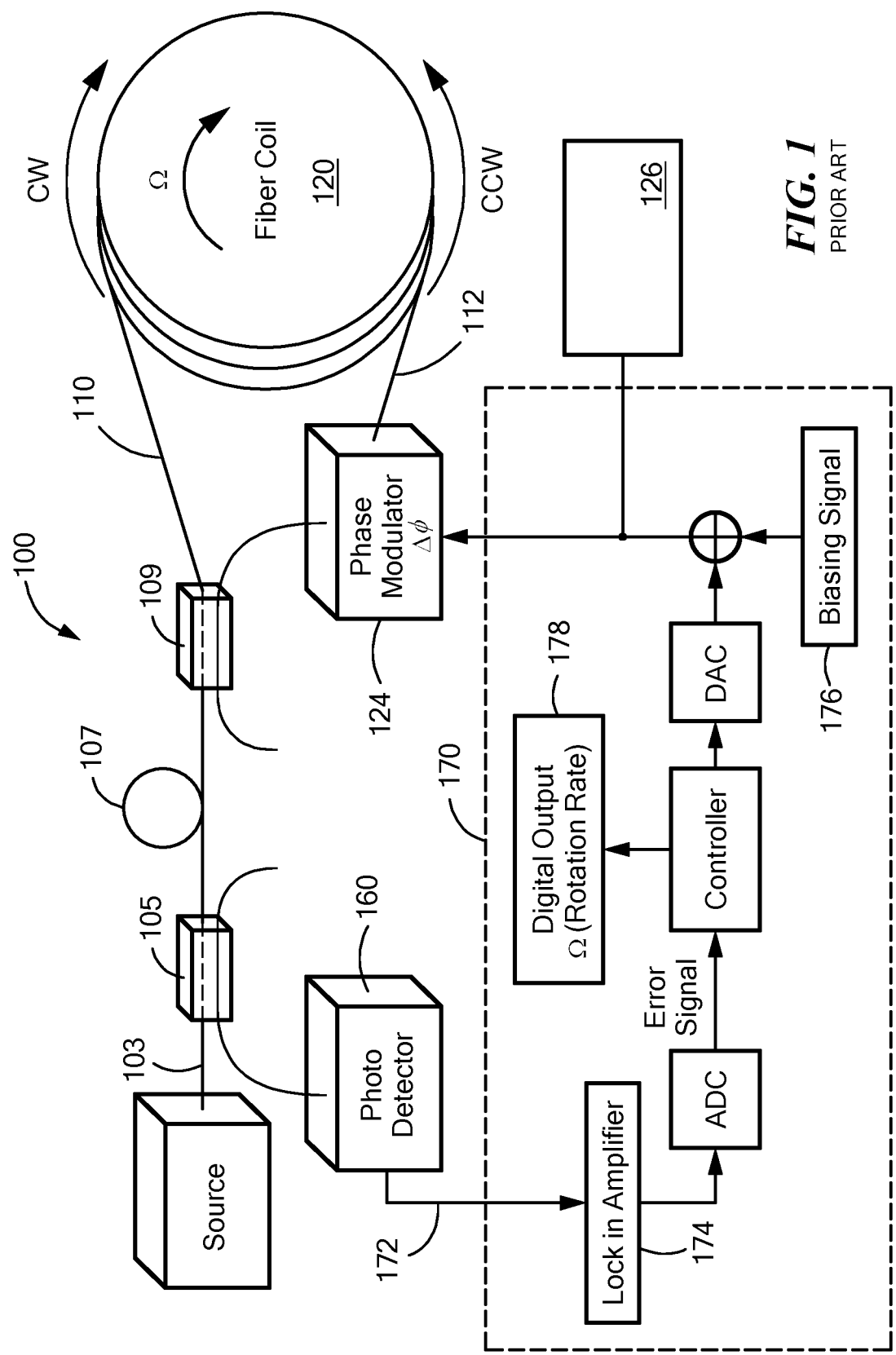
FIG. 1 is a schematic depiction of a prior art closed loop interference fiber optic gyroscope.

Interferometry is routinely used to sense and measure the effect of a physical quantity on the phase of light transmitted through an optical fiber or through a configuration of optical fibers constituting an optical sensor. The rudiments of interferometric measurement of phase in fiber optic sensors were reviewed by Giallorenzi et al., Optical Fiber Technology," IEEE Trans. Microwave Theory and Techniques, vol. MTT-30, pp. 472-511 (1982), which is incorporated herein by reference. The rudiments of fiber optic gyroscopes (FOGs), to cite one class of optical sensors, may be found in Burns, Optical Fiber Rotation Sensing, (1994), incorporated herein by reference. Basic operation of a closed-loop FOG, designated generally by numeral 100, of a type employing digital phase modulation, is now described generally with reference to FIG. 1, shown in Sireesha et al., "Comparative Assessment on Linearity Test based V$2\pi$ and V$\pi/2$ Voltage Variations of Closed Loop IFOG," Int. J. Electr. & Computer Eng., vol. 6, pp. 583-95 (2016), which is incorporated herein by reference. Closed-loop FOG 100 serves as an exemplary fiber optic sensor to which the presently described invention may advantageously be applied. The example of closed-loop FOG 100 is provided, however, without limitation.

Coherent light generated by source 101, typically a laser, is injected into optical fiber 103, and coupled, via a first directional coupler 105, a polarizer 107, and a second directional coupler 109. One output of directional coupler 109 is coupled to a first end 110 of a fiber coil 120 while a second end of directional coupler 109 is coupled to a second end 112 of fiber coil 120 via a phase modulator 124. Fiber sensing coil 120 may be referred to herein synonymously as loop 120.

As is well known, the Sagnac effect causes a phase shift the optical phase between beams counterpropagating in fiber sensing coil 120, when fiber sensing coil 120 is rotating with angular rotation rate Q. This is due to the fact that the beam injected into first end 110 that co-rotating with loop 120 effectively travels a longer path than the counter-rotating beam injected into second end 112. The beams exiting from respective ends 110 and 112 of loop 120 are recombined at directional coupler 109, and the recombined beam incident on photodetector 160 exhibits interference effects due to the relative phase shift between the beams counterpropagating through fiber coil 120. In a closed loop approach, the photo detector output 172 demodulated by lock-in amplifier 174 at a phase modulation frequency governed by phase modulation driver 126 is used as an error signal. Controller 175 of phase loop 170 receives a digitized error signal and introduces a controlled amount of non-reciprocal phase difference, added to biasing signal 176, between the two counter propagating optical waves, thereby counteracting the rotation-induced signal phase shift.

Thus the net phase difference between the two interfering waves is maintained at zero regardless of the rotate rate. The introduced amount of nonreciprocal phase shift is the output 178 of the gyroscope 100 and is linear with respect to rotation rate $\Omega$, by virtue of the fact that the net phase difference is maintained at a null. That is to say, it is fed back into the system to generate an feedback phase difference that is maintained opposite to the Sagnac phase shift. Advantages of the closed loop system include the absence of moving parts and attendant ruggedness and reliability, high sensitivity and linearity, wide dynamic range, and bias stability.

The Achilles heel of such systems, however, resides in phase modulator 124 itself, which, in current practice, is necessarily a discrete component, such as a proton-exchanged lithium-niobate integrated optics phase modulator, the limiting features of which are discussed in the Background section.

In accordance with embodiments of the present invention, the function of phase modulation in a fiber optic sensor is fulfilled by one or more segments of an optical fiber that has been prepared in such a manner as to induce a second-order optical nonlinearity in the fiber. When a material is characterized by a second-order optical nonlinearity, application of an electric field causes a variation of the dielectric properties of the material, and thus of the index of refraction of the material at an optical wavelength. This property is referred to as the Kerr effect, and it may be a DC or an AC effect.

A particularly advantageous way to induce a second-order optical nonlinearity in glass is to pole the glass by using any of a number of procedures that have been discussed in the literature. A review of poling technology and applications thereof, primarily with regard to silicate glasses, may be found in Fleming et al., "*Poled glasses and poled fibre devices,*" *J. Ceramic Soc. of Japan*, vol. 116, pp. 1007-23 (2008), which is incorporated herein by reference. Chalcogenide glasses have also been poled, and second-order nonlinearities induced, as discussed, for example, by Liu et al., "*Second-harmonic generation in $Ge_{20}As_{25}S_{55}$ glass irradiated by an electron beam,*" *Opt. Lett.*, vol. 26, pp. 1347-49 (2001), also incorporated herein by reference. All methods, known and yet to be developed, for poling glasses are within the scope of the present invention.

Polymer optical fibers may also be employed, using techniques of poling single-mode polymer fiber and embedding electrodes to achieve phase modulation, as taught by Welker et al., "*Fabrication and characterization of single-mode electro-optic polymer optical fiber,*" *Opt. Lett.*, vol. 23, pp. 1826-28 (1998), which is incorporated herein.

A preferred core material, for practicing the present invention, is optical fiber with a germanosilicate core, long known to lend itself to poling, as described by Kazansky et al., "*High second-order nonlinearities in poled silicate fibers,*" *Opt. Lett.*, vol. 19, pp. 1-3 (1994), and Kazansky et al., "*Glass Fiber Poling and Applications,*" *J. Lightwave Tech.*, vol. 15, pp. 1484-92 (1997), both of which papers are incorporated herein by reference. Ge-doped silica fiber may be poled by with 4-6 kilovolts applied across the fiber at 200-300° C. for 15-50 minutes. A representative procedure is taught by Kazansky (1997). Once poled in this manner, a length of the fiber between 0.5-1 meter has a $V\pi$ of 200-300 V, and can modulate at frequencies greater than 4 MHz, with electric fields applied by applying voltages across metal electrodes adapted by embedding in the fiber, in a manner described, for example, in Myrén, *Poled fiber devices*, Doctoral Thesis, Royal Institute of Technology, Stockholm (2005), which is incorporated herein by reference. While a fabrication method whereby electrodes are drawn with the fiber is preferred, any method whereby a field may be applied across the poled segment is within the scope of the present invention.

In comparison with lithium-niobate modulators, poled fiber modulation may advantageously provide the following features:
- very low cost and low complexity;
- seamless integration with sense-coil;
- high optical damage threshold;
- low dispersion; and
- insofar as the poled glass is not a ferroelectric material, fewer drift mechanisms.

Figure 2:
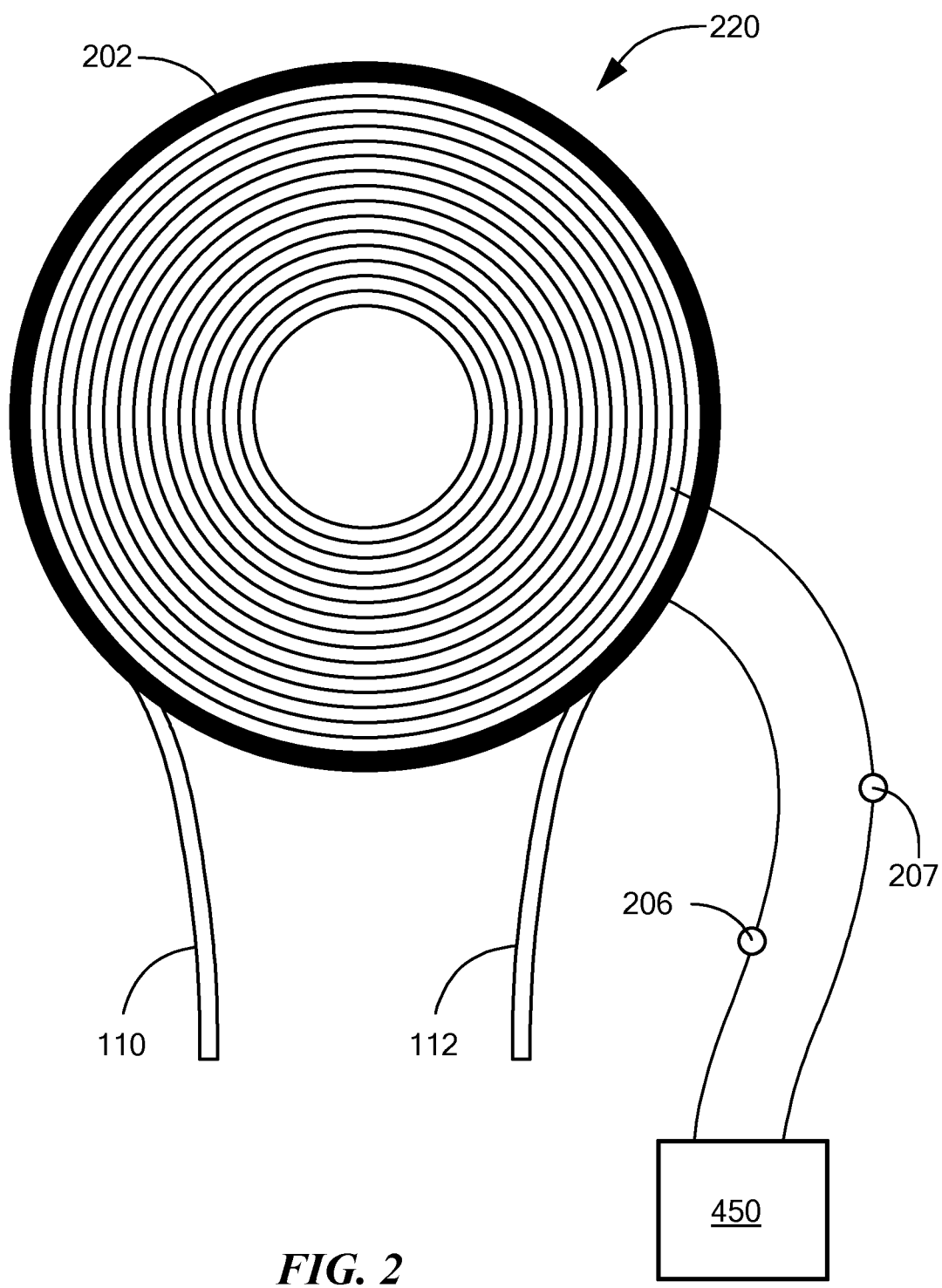
FIG. 2 depicts a fiber sensing coil with a poled segment allowing for phase modulation of a beam traversing the coil, in accordance with an embodiment of the present invention.

An embodiment of the present invention is now described with reference to FIG. 2, showing fiber coil 220 (also referred to herein as a sensing loop), described above in the context of a prior art rotation sensor with respect to FIG. 1. It is to be understood that all fiber optic sensors are encompassed within the scope of the present invention, and that fiber coil 220 is merely representative of a length of optical fiber sensitive to a physical parameter, such as acceleration, rotational or otherwise, or temperature, etc. The polarization mode supported by fiber coil 220 may be linear, but is not required to be, within the scope of the present invention. Two ends 110 and 112 of fiber coil 220 are also indicated. Light in at least one linearly polarized mode is injected into fiber coil 220 as described above with reference to FIG. 1. Whereas phase modulation in the prior art has always been provided by a discrete phase modulator 124 (shown in FIG. 1) or by mechanically modulating the fiber, phase modulation is now provided, for the first time, by electrooptically modulating the index of refraction, using the Kerr effect, in one or more poled segments 202 which are integral with the fiber comprising fiber coil 220. Phase modulation is achieved by applying voltage, using controller 450, to terminals 206 and 207, each coupled to an electrode (not shown) embedded in the poled segment 202, thereby generating an electric field across the poled segment 202.

Figure 3:
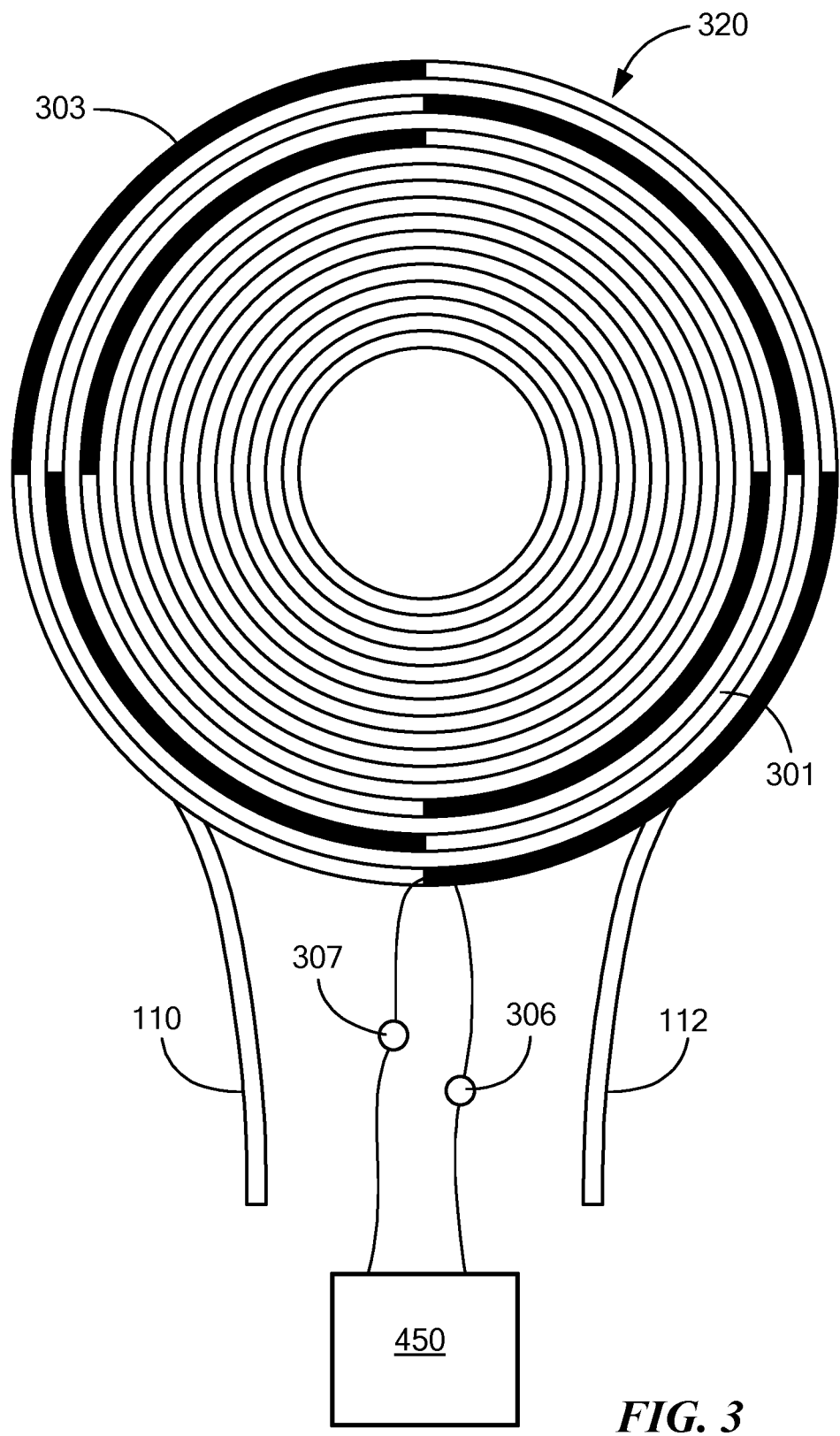
FIG. 3 depicts a fiber sensing coil with a poled segment allowing for phase modulation of a beam traversing the coil, in accordance with an embodiment of the present invention.

Referring now to the fiber coil (or sensing coil) designated generally by numeral 320 in FIG. 3, multiple poled segments 301 and 303 may be non-contiguous, thereby advantageously achieving lower values of $V\pi$ that are useful in sensor applications, and increase modulation frequency performance. As in the case of FIG. 2, it is to be understood that all fiber optic sensors are encompassed within the scope of the present invention, and that fiber coil 320 is merely representative of a length of optical fiber sensitive to a physical parameter, such as acceleration, rotational or otherwise, or temperature, etc. Two ends 110 and 112 of fiber coil 320 are also indicated. Whereas phase modulation in the prior art has always been provided by a discrete phase modulator 124 (shown in FIG. 1) or by mechanically modulating the fiber, phase modulation is now provided, for the first time, by electrooptically modulating the index of refraction, using the Kerr effect, in multiple poled segments 301 and 303. Phase modulation is achieved by applying a voltage, using controller 450, across terminals 306 and 307, each coupled to an electrode (not shown) embedded in the poled segment 301, and similarly in the other poled segments, thereby generating electric fields across each of the poled segments. The use of multiple poled segments as elements contributing to a cumulative shift in optical phase may advantageous increase the length of modulating fiber while simultaneously maintaining a high modulation frequency. Reduced operating voltage and increased modulation frequency may thus advantageously be achieved.

Figure 4:
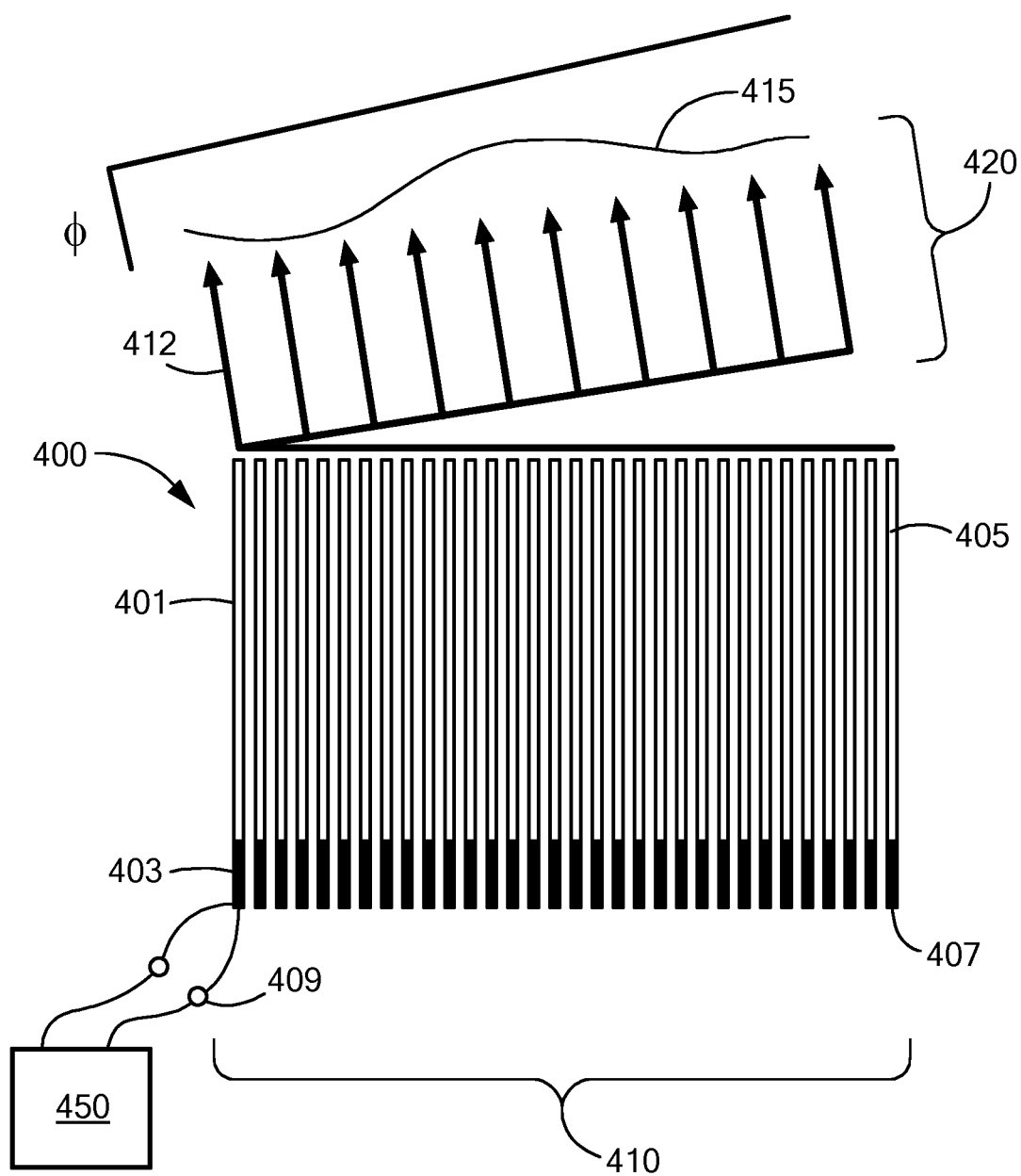
FIG. 4 depicts an optical phased array founded on a plurality poled optical fiber segments, allowing for differential phase modulation across a beam, in accordance with an embodiment of the present invention.

A review of optical phased arrays dating back to 2009 may be found in McManamon et al., "*A Review of Phased Array Steering for Narrow-Band Electrooptical Systems,*" *Proc.* IEEE, vol. 97, pp. 1078-96 (2009) ("McManamon (2009)"), which is incorporated herein by reference. A novel technology for phasing an optical wavefront and thereby steering a beam is now described with reference to FIG. 4, where a one-dimensional slice of an optical phased array, designated generally by numeral 400, is shown. An optical beam 420 characterized by optical phase front 415 may be launched in a direction 412, and with specified properties, by differentially retarding the phase $\phi$ of propagation through distinct fibers 401, 405 of optical phased array 400.

Figure 5A:
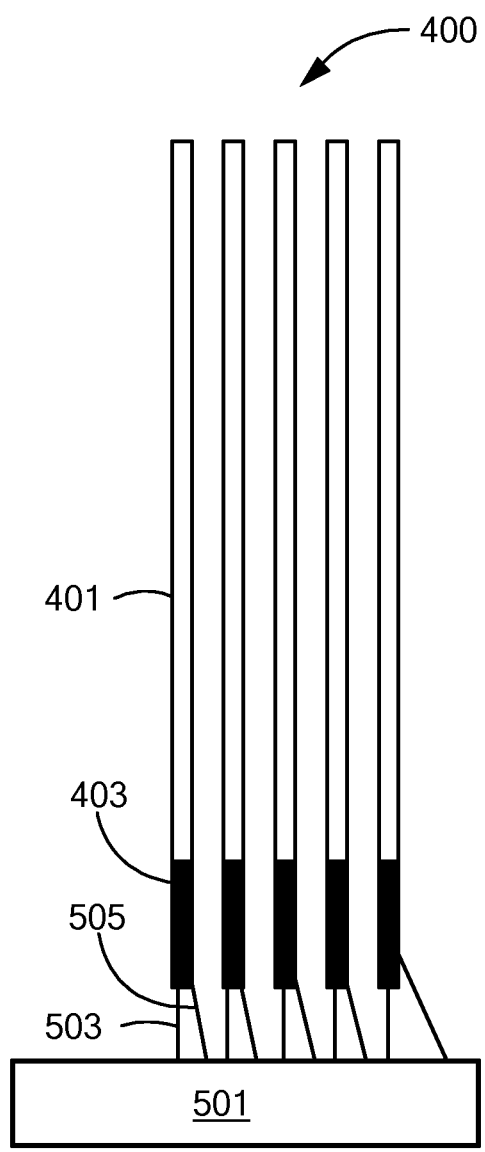
FIGS. 5A and 5B are cross-sectional schematic views, taken along vertical and horizontal planes, of the optical phased array of FIG. 4, showing electrical connections in accordance
Figure 5B:
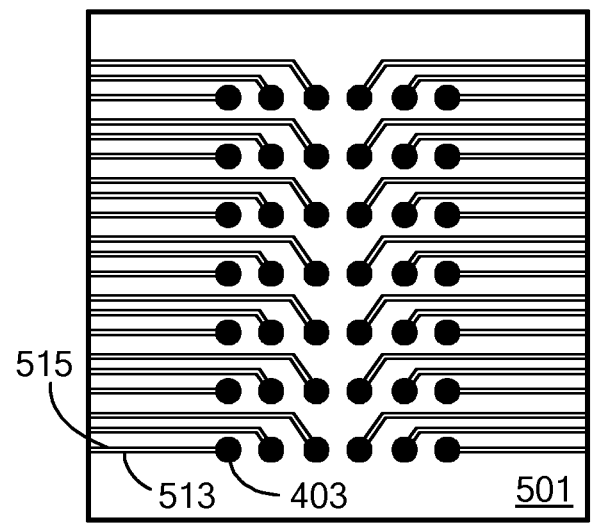

Distinct fibers 401, 405 belong to a two-dimensional bundle of fibers 410. To the extent to which bundle 410 is characterized by one or more periodicities, it may be referred to herein as an "array." Each distinct fiber contains a poled segment 403, 407 that introduces a relative phase lag as an electric field is applied across it by virtue of an electrode (not shown) embedded in each fiber. The electric field is generated by a controller 450 that applies an electric potential to terminals 408 and 409 of poled segment 403 creating an electric field across poled segment 403. Exiting optical beam 420 may be phased in such as manner as to create a collimated beam or a converging or diverging beam, for example. Similarly, direction 412 of beam 420 may be steered, using known phased array steering techniques such as discussed in McManamon (2009), for example. FIGS. 5A and 5B depict embodiments for coupling optically phased array 400 to a power and control board 501. Two leads 503 and 505 may fan out from each poled segment 403 as depicted in FIG. 5A, while FIG. 5B shows a cross-sectional view from the bottom of power and control board 501 with leads 513 and 515 providing for electrical potentials to be applied to leads within each poled segment 403, with respect to each other or else with respect to a common ground plane.

Poled-glass fibers have a comparatively high optical power damage threshold. Therefore, embodiments of the invention described above may advantageously facilitate high-power OPA-based beam steering systems for laser target designators and range finders, for example.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

We claim:

1. A fiber optical sensor comprising:
   a. an optical fiber supporting propagation of light in at least one polarized mode, the optical fiber configured as an interferometer;
   b. a source of light coupled to inject light into the optical fiber;
   c. a detector for detecting variation, with a sensed quantity, of a phase of interfering light traversing the optical fiber; and
   d. an electrode adapted for applying an electric field across a portion, up to an entirety, of the optical fiber;
   wherein a plurality of non-contiguous segments of the optical fiber are poled in such a manner as to induce a phase shift in light propagating through the optical fiber in response to application of voltage to the electrode and
   wherein the phase shift is achieved via a process associated with a second-order susceptibility of the optical fiber.

2. A fiber optical sensor in accordance with claim 1, wherein the sensed quantity is rotation.

3. A fiber optical sensor in accordance with claim 1, wherein the optical fiber includes a silicate glass.

4. A fiber optical sensor in accordance with claim 1, wherein the optical fiber includes a chalcogenide glass.

5. A fiber optical sensor in accordance with claim 1, wherein the optical fiber includes Ge-doped silica.

6. A fiber optical sensor in accordance with claim 1, wherein the optical fiber includes a polymer.

7. A fiber optical sensor in accordance with claim 1, wherein the process associated with a second-order susceptibility of the optical fiber is at least one of a DC and AC Kerr effect.

8. A fiber optical sensor in accordance with claim 1, wherein all phase modulation is integral to the optical fiber.

9. A fiber optical sensor comprising:
   a. an optical fiber supporting propagation of light in at least one polarized mode; and
   b. an electrode adapted for applying an electric field across a portion, up to an entirety, of the optical fiber;
   wherein a plurality of non-contiguous segments of the optical fiber are poled in such a manner as to induce a phase shift in light propagating through the optical fiber in response to application of a voltage to the electrode and
   wherein the phase shift is achieved via a process associated with a second-order susceptibility of the optical fiber.

10. A fiber optical sensor in accordance with claim 9, wherein the optical fiber includes a silicate glass.

11. A fiber optical sensor in accordance with claim 9, wherein the optical fiber includes a chalcogenide glass.

12. A fiber optical sensor in accordance with claim 9, wherein the optical fiber includes Ge-doped silica.

13. A fiber optical sensor in accordance with claim 9, wherein the optical fiber includes a polymer.

14. A fiber optical sensor in accordance with claim 9, wherein the process associated with a second-order susceptibility of the optical fiber is at least one of a DC and AC Kerr effect.

15. An optical phased array comprising:
   a. a plurality of waveguide elements, each waveguide element supporting propagation of an optical wave; and
   b. an electrode adapted for applying an electric field across a portion, up to an entirety, of at least one of the plurality of waveguide elements;
   wherein at least one segment of the at least one of the plurality of waveguide elements is poled in such a manner as to induce a phase shift in light propagating through the waveguide element in response to application of a voltage to the electrode,
   wherein the phase shift is achieved via a process associated with a second-order susceptibility of the at least one of the plurality of waveguide elements; and
   wherein the plurality of waveguide elements is adapted for phasing an optical wavefront.

\* \* \* \* \*